No. 12,018. Reissued July 29, 1902.
E. LURCH.
SWING.
(Application filed Feb. 1, 1902.)
Fig. 1,
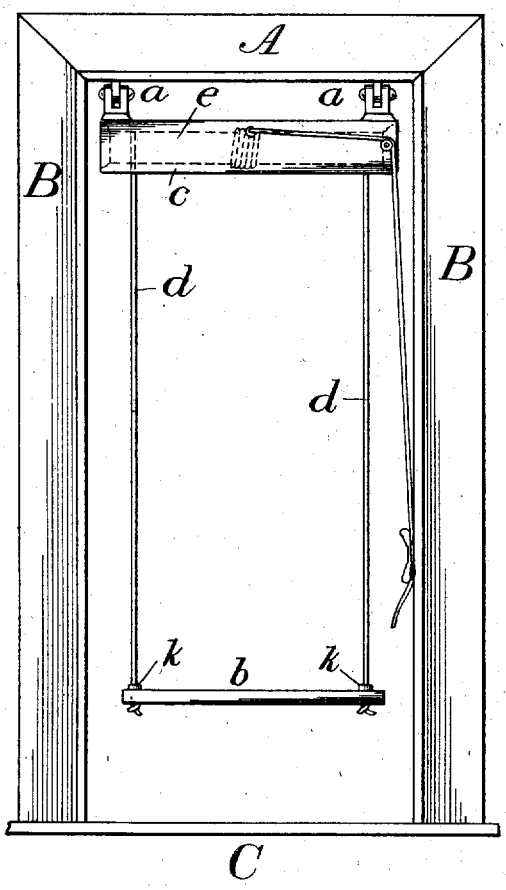
Fig. 2,
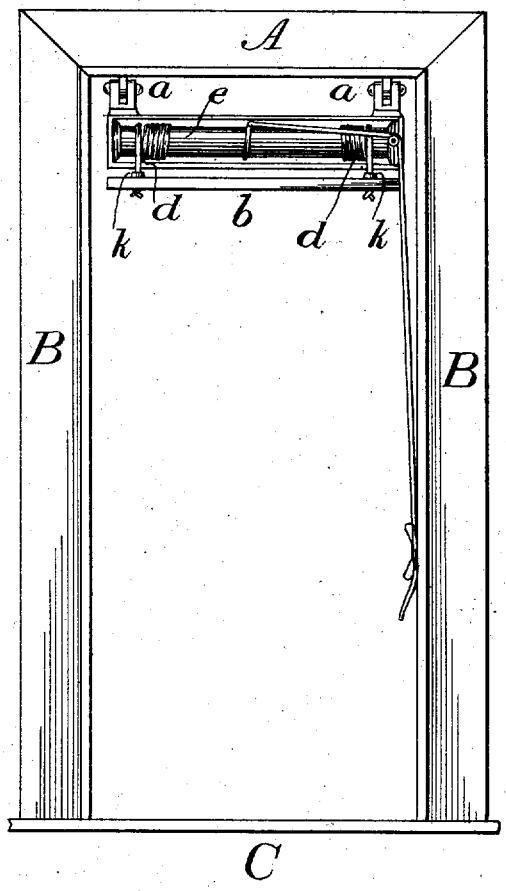
Fig. 3,
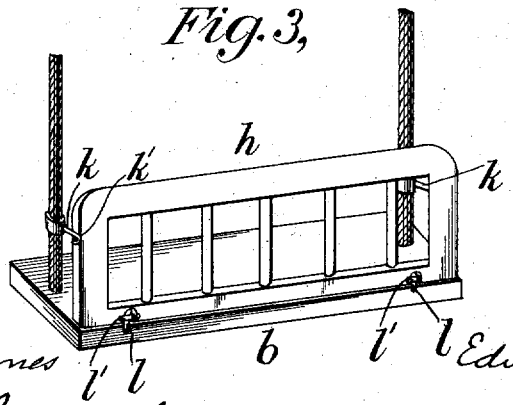
WITNESSES:
Henry Barnes
Archibald Macintosh
INVENTOR
Edward Lurch
BY
Henry D. Williams
ATTORNEY
THE NORRIS PETERS CO., PHOTO-LITHO., WASHINGTON, D. C.

UNITED STATES PATENT OFFICE.

EDWARD LURCH, OF NEW YORK, N. Y., ASSIGNOR OF TWO-THIRDS TO HENRY C. BABCOCK, JR., AND JOHN P. TUPPER, OF BOROUGH OF BRONX, NEW YORK, N. Y.

SWING.

SPECIFICATION forming part of Reissued Letters Patent No. 12,018, dated July 29, 1902.

Original No. 670,287, dated March 19, 1901. Application for reissue filed February 1, 1902. Serial No. 92,229.

*To all whom it may concern:*

Be it known that I, EDWARD LURCH, a citizen of the United States, and a resident of the borough of the Bronx, city of New York, county of New York, and State of New York, have invented certain new and useful Improvements in Swings, of which the following is a specification, reference being had to the accompanying drawings, forming a part thereof, in which similar letters of reference indicate corresponding parts.

This invention relates to improvements in swings.

The nature and object of the invention will be fully understood from the following general description and the accompanying drawings and will be subsequently pointed out in the claims.

Figure 1 is a view of an open door with my improved swing hanging in it in extended position. Fig. 2 is a view of the same, partly in section and with the swing drawn up. Fig. 3 is a detail view of the seat of the swing.

A designates the lintel of the door, B and B the posts, and C the sill.

*c* designates a box or case or support of rectangular form, which may be of any suitable material. In this box, extending from end to end, is journaled the revoluble roller *e*. This case *c* may be attached to the lintel A of the door in any common and well-known way. In the example of my invention here given I have illustrated it as attached by ears and bolts *a*. On the roller *e* at either end, inside of the case *c*, are wound suspending means or ropes *d*. These ropes are attached at one end to the roller *e*, and passing through a hole in the bottom of the case *c* are fastened at the other end to the seat of the swing, which seat is designated by *b*. These ropes *d* are both wound the same way around the roller *e*. On the middle of the roller *e* is wound the hoisting-cord *i*. This is wound around the roller *e* in the opposite way from the ropes *d*, and passing through the wall of the case, over the pulley *c'*, and over the pulley *i'*, extends downward to the fastening means or cleat *f*, on which it may be fastened. The seat of the swing consists of a seat-board *b* and a back *h*. This back may be detachably fastened in any common and well-known way. In the example of my invention here given I illustrate it as fastened at each side by the hooks *k*, which embrace the ropes *d* and engage the pins *k'*, and at the bottom by the tines *l*, which engage the eyes *l'* on the back *h*, all the various parts of the mechanism to be substantially as illustrated in the drawings.

To use my invention, the case *c* is fastened, as aforesaid, to the lintel of the door, as illustrated in the drawings. It will then be found that as the seat of the swing is let down (and for that purpose the ropes *d* unwind from the roller *e*) the cord *i* will wind up on the roller. When the seat-board *b* has arrived at its lowest position, with the ropes *d* completely unwound, as shown in Fig. 1, the swing is in operative position, and the end of the hoisting-cord may be secured on the cleat *i*; but it is not usually desirable that it should be held so taut as to subject the hoisting-cord or cleat to the strain resulting from the weight of person in the swing and the operation of the swing. The back *h* of the seat may then be put on, with the hooks *k* engaging the pins *k'* and the tines *l* engaging the eyes *l'*, as aforesaid. The swing will then be ready and may be used in the common and well-known way. Thus far while the swing is in use it is supposed to hang in the door; but when the swing is not in use it may be removed as follows: The back *h* is first to be removed by releasing the hooks *k* from the pins *k'* and lifting up the back *h*, so as to disengage the tines *l* from the eyes *l'*. Then when the back *h* has been removed the operator unfastens the cord *i* from the cleat *f* and pulls it so as to unwind it from the roller *e*. This, on account of the arrangement before described, causes the ropes *d* to wind on the roller *e*. This operation may be continued until the seat-board *b* is drawn up to the case *c*, as illustrated in Fig. 2. The cord *i* is then fastened to the cleat *f* again, and the parts of the mechanism will so remain until their positions are altered, as before described.

It is evident that if the case *c* and the seat-board *b* be of proper width and properly arranged the door can, when they are in the position illustrated in Fig. 2, easily be opened and closed without interference from the seat-board or case. It is also evident that this swing may be attached to many other supports besides doors and so operated with equal success. It is evident that various modifications may be made in the construction above particularly described, and shown in the drawings, within the spirit and scope of my invention.

What I claim as my invention, and desire to secure by Letters Patent, is—

1. In a swing, the combination of a revoluble roller, a support for the roller containing journals for the same and adapted to be fastened to the lintel of a door, two flexible suspending means each secured to said roller and adapted to be wound thereon, a hoisting-cord secured to said roller and arranged so as to be wound thereon when the suspending means are unwound, a seat carried by the suspending means and adapted to be raised into proximity to the revoluble roller by the winding of the suspending means about the revoluble roller effected by tension upon and the unwinding of the hoisting-cord and lowered into operative position by the unwinding of said suspending means and consequent winding of the hoisting-cord around the revoluble roller, and fastening means for preventing the rotation of the revoluble roller.

2. In a swing, the combination of a revoluble roller, a support for the roller containing journals for the same and adapted to be fastened to the lintel of a door, flexible suspending means secured to said roller and adapted to be wound thereon, a hoisting-cord secured to said roller and arranged so as to be wound thereon when the suspending means are unwound, a seat having a detachable back and carried by the suspending means and adapted to be raised into proximity to the revoluble roller by the winding of the suspending means about the roller effected by tension upon and the unwinding of the hoisting-cord and lowered into operative position by the unwinding of the suspending means and consequent winding of the hoisting-cord around the revoluble roller, and means for fastening the hoisting-cord.

3. In a swing, the combination with a case adapted to be fastened to the lintel of a door, means for so fastening such case, and a revoluble roller of uniform size through its whole length, and journaled in said case, of two ropes wound one way, one around each end of said roller, and extending without said case, a seat-board fastened on said ropes, a seat-back detachably fastened to said board and said ropes, a cord wound around the middle of said roller, in said case, in a direction opposite to said ropes, and extending without said case, and a cleat secured to the post of said door, upon which said cord is fastened to hold said swing-seat in any required position, substantially as set forth.

In testimony that I claim the foregoing as my invention I have signed my name, in presence of two witnesses, this 27th day of January, 1902.

EDWARD LURCH.

Witnesses:
HENRY D. WILLIAMS,
JOHN J. HUGHES.